UNITED STATES PATENT OFFICE.

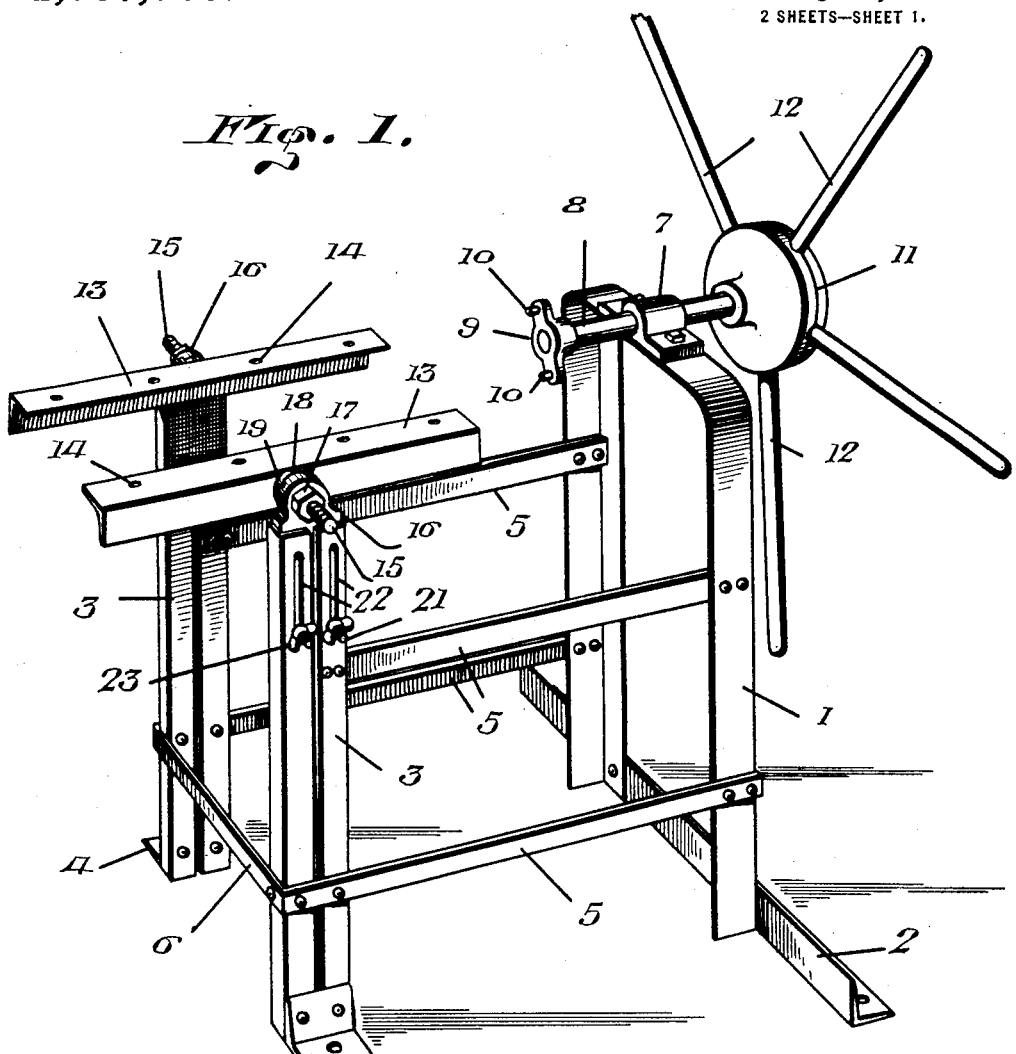
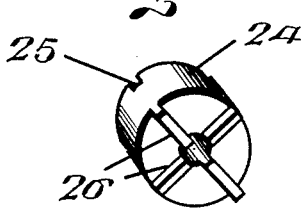

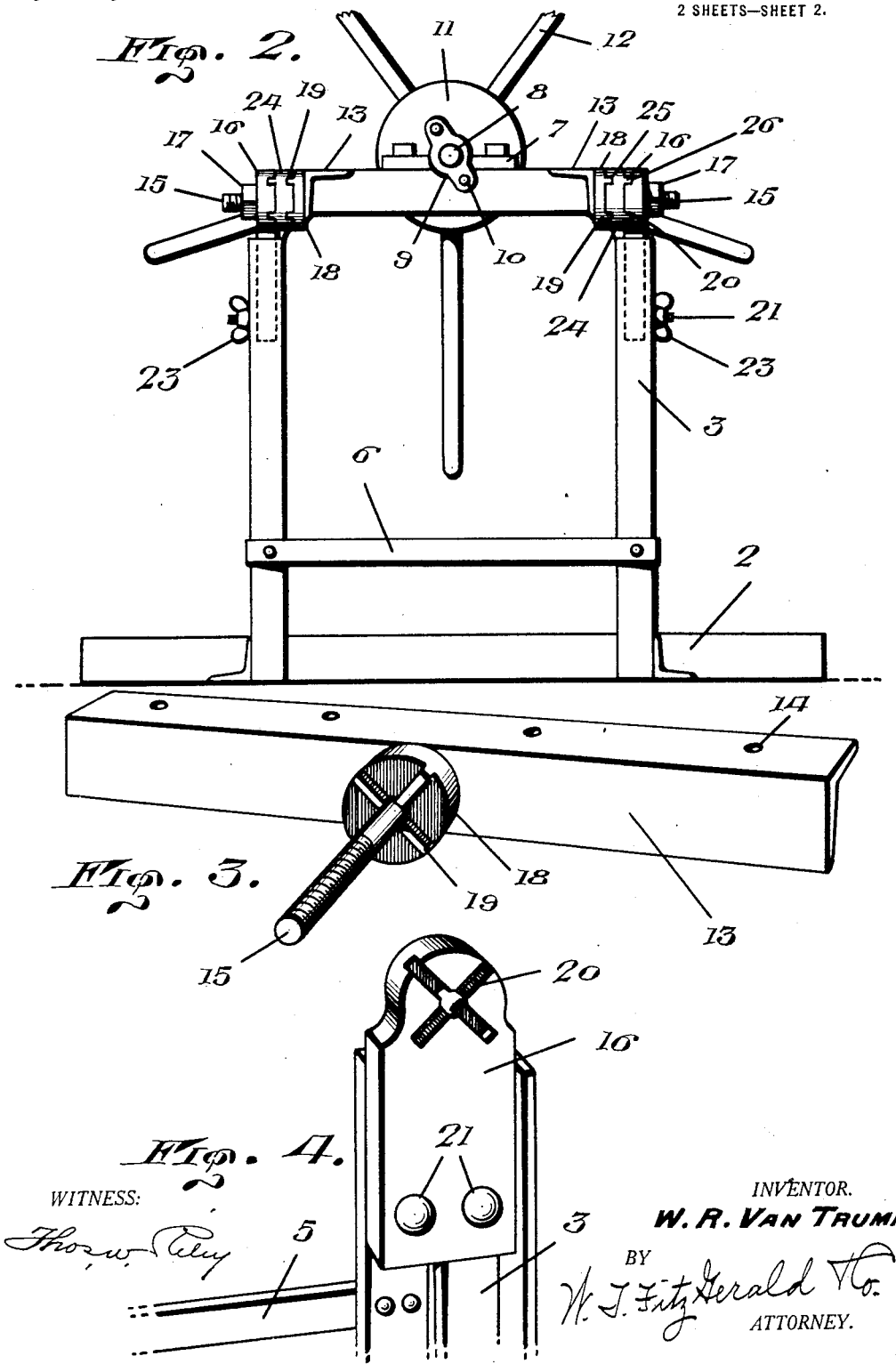

WILLIAM R. VAN TRUMP, OF PHILADELPHIA, PENNSYLVANIA.

ENGINE-OVERHAULING STAND.

1,387,566.  Specification of Letters Patent.  Patented Aug. 16, 1921.

Application filed January 27, 1920. Serial No. 354,336.

*To all whom it may concern:*

Be it known that I, WILLIAM R. VAN TRUMP, a citizen of the United States, residing at Philadelphia, in the county of Philadelphia and State of Pennsylvania, have invented certain new and useful Improvements in Engine-Overhauling Stands; and I do hereby declare the following to be a full, clear, and exact description of the invention, such as will enable others skilled in the art to which it appertains to make and use the same.

This invention relates to a stand for supporting an automobile engine, or the like, for the purpose of overhauling, assembling or doing other work on such engines, and aims to provide a device of that character which will enable the engine to be worked or operated on conveniently.

The object of the invention is the provision of an engine overhauling stand having means for supporting the engine so that it can be tilted to different positions, and means for connection with the engine crank shaft for the purpose of conveniently and forcibly turning same, as when fitting new bearings, new pistons, piston rings, gears, and the like.

A further object is the provision of adjustments for handling various makes of engines. With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a perspective view of the stand.

Fig. 2 is an end view thereof.

Fig. 3 is a perspective view of one of the engine-supporting bars.

Fig. 4 is a perspective view of one of the bearings of such bars.

Fig. 5 is a perspective view of a spacer used for adjustment to accommodate engine crank casings of different widths.

The stand comprises a frame composed of metal stock, including an inverted U-shaped post 1 at one end of the frame, having its lower ends secured to a transverse foot bar 2, and at the other end of the frame, it is provided with a pair of corner posts 3 having the feet 4 at their lower ends. The bar 2 and feet 4 can be secured on the floor or base, to make the stand rigid, and tie bars or braces 5 connect the posts 1 and 3, while a tie bar or brace 6 connects the posts 3, leaving the space between the upper portions of said posts to be unobstructed for accommodating the engine.

The means for turning the engine crank shaft is mounted on the post 1, and includes a bearing 7 secured on said post in which a horizontal longitudinal shaft 8 is journaled for rotation and sliding movement. The head 9 is secured to the inner end of this shaft 8 and has pins or lugs 10 for engaging an apertured collar or flange on one end of the engine crank shaft, although other clutch means can be used for making this connection between this shaft 8 and engine crank shaft. On the outer end of the shaft 8 is secured a hub 11 having handle members 12 radiating therefrom, and forming a hand wheel providing for considerable power and leverage for turning the engine crank shaft.

The engine-supporting means is carried by the posts 3, and includes a pair of supporting bars 13 of angle iron or other suitable stock, provided with apertures 14 for bolting the side flanges of the engine crank casing to said bars, it being understood that the crank casing can be placed between said bars with the side flanges seating thereon. The bars 13 are provided between their ends with outstanding trunnions 15 journaled in bearings 16 carried by the upper ends of the posts 3, whereby said bars can be turned about a transverse axis for similarly turning the engine for tilting it to different positions. Nuts 17 or equivalent means are screw threaded or otherwise engaged on the trunnions 15 for clamping the bars 13 in any desired adjusted position, said bars 13 having bosses 18 at the basal ends of the trunnions 15 to bear against the bearings 16. In order to positively retain the bars 13 in vertical and horizontal positions, the bosses 18 have radial ribs 19 to enter radial grooves 20 in the bases of the bearings 16, thereby serving to lock the bars 13 in horizontal and vertical positions when the nuts 17 are tightened.

It is preferable to provide adjustments whereby various makes of engines can be accommodated. The bearings 16 are therefore carried for vertical adjustment by the posts 3, said bearings being provided with bolts 21 or the like, working in vertical slots 22 in the posts 3, and having wing nuts 23 thereon for clamping said bearings in their vertical adjusted positions. The bearings and bars 13 can therefore be adjusted vertically to bring the crank shaft of the engine into alinement with the shaft 8.

A further adjustment is provided for the spacing of the bars 15 to different distances apart, to accommodate engine crank casings of different widths. Thus, spacers 24 of suitable thicknesses can be disposed on the trunnions 15 between the bearings 16 and bosses 18, to space the bars 13 closer together, and the opposite faces of said spacers 24 have grooves 25 and ribs 26 to engage the ribs 19 and grooves 20 whereby the bars can be locked in vertical and horizontal positions as above indicated. Spacers 24 of different sizes can be used, or any number thereof can be placed on the trunnions, so that the bars 13 can be spaced the required distance apart, within the limits of adjustment.

In using the stand, when the engine is seated on and secured to the engine-supporting bars 13, it can be tilted to vertical and horizontal positions and inverted for performing the work thereon conveniently, and by swinging the engine to a horizontal position with the crank shaft in alinement with the shaft 8 and the proper end of the crank shaft adjacent to said shaft 8, the shaft 8 can be slid toward the engine to bring its clutch portion into connection with the engine crank shaft, so that said crank shaft can be turned with considerable force and purchase by turning the handle members 12. This will make it convenient for turning the crank shaft in fitting new bearings, pistons, piston rings, gears, etc., and the bearings may be set very tight and wiped in to a perfect fit.

Having thus described the invention, what is claimed as new is:—

1. An engine overhauling stand comprising a frame, engine-supporting means within the frame, bearings carried by the frame and supporting said means for tilting movement about a transverse axis, a longitudinal shaft having means to move into engagement with the engine crank shaft and having means for manually turning same, and a bearing supporting said shaft for rotary and sliding movement from the frame, some of said bearings being vertically adjustable on the frame to adjust said means and shaft vertically relatively to one another.

2. An engine overhauling stand comprising a frame, a shaft mounted for rotary and sliding movement on the frame, and having means movable into engagement with an engine crank shaft and means for manually turning said shaft, and engine-supporting means mounted on the frame for tilting movement about an axis transversely of the axis of said shaft.

3. An engine overhauling stand comprising a frame, a pair of engine-supporting bars, a shaft mounted for rotary and sliding movement on the frame and having means for connection with an engine crank shaft and means for turning it, and adjustable means for mounting said bars on the frame for vertical adjustment, for adjustment toward and away from one another, and for tilting movement about an axis transversely of the axis of said shaft.

4. An engine overhauling stand comprising a frame having spaced posts, bearings supported by said posts, engine-supporting bars having trunnions journaled in said bearings, means on said trunnions for clamping said bars to the bearings, and means between said bars and bearings for holding said bars in various positions.

5. An engine overhauling stand comprising a frame having bearings, engine-supporting bars having trunnions journaled in said bearings, means between said bars and bearings for spacing the bars apart the desired distance and for holding said bars in various positions, and means for holding said bars, means and bearings together.

6. An engine overhauling stand comprising a frame, vertically adjustable bearings carried by the frame, engine-supporting means trunnioned to said bearings, and a shaft mounted for rotary and sliding movement on the frame and having means at its inner end for connection with an engine crank shaft and means at its outer end for turning said shaft manually.

In testimony whereof I have signed my name to this specification in the presence of two subscribing witnesses.

WILLIAM R. VAN TRUMP.

Witnesses:
JAMES H. ESELBA,
ROBERT T. SIMPSON.